United States Patent
Speer

(10) Patent No.: US 9,855,938 B2
(45) Date of Patent: Jan. 2, 2018

(54) PRESSURE CHANGE DAMPER FOR A HYDRAULIC VEHICLE BRAKE SYSTEM WITH BRAKE FORCE CONTROL, AND HYDRAULIC VEHICLE BRAKE SYSTEM WITH BRAKE FORCE CONTROL WITH SUCH A PRESSURE CHANGE DAMPER

(71) Applicant: Robert Bosch GmbH, Stuttgart (DE)

(72) Inventor: Harald Speer, Freiberg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 14/970,807

(22) Filed: Dec. 16, 2015

(65) Prior Publication Data

US 2016/0176387 A1  Jun. 23, 2016

(30) Foreign Application Priority Data

Dec. 16, 2014 (DE) .................. 10 2014 226 005

(51) Int. Cl.
*B60T 8/40* (2006.01)
*B60T 8/36* (2006.01)
*F16K 15/04* (2006.01)
*F16L 55/05* (2006.01)
*F16L 55/053* (2006.01)

(52) U.S. Cl.
CPC ............ *B60T 8/4068* (2013.01); *B60T 8/368* (2013.01); *F16K 15/04* (2013.01); *F16L 55/05* (2013.01); *F16L 55/053* (2013.01)

(58) Field of Classification Search
CPC .......... B60T 8/42; B60T 8/4068; F16L 55/04; F16L 55/041; F16L 55/043; F16L 55/045; F16L 55/05; F16L 55/052; F16L 55/053
USPC ..................................................... 138/30, 31
See application file for complete search history.

(56) References Cited

U.S. PATENT DOCUMENTS

| | | | | |
|---|---|---|---|---|
| 4,526,205 A * | 7/1985 | Sugimura | ............ | F16L 55/053 138/30 |
| 6,164,336 A * | 12/2000 | Pasquet | ................. | B60T 8/4068 138/26 |
| 2004/0217559 A1 * | 11/2004 | Schlitzkus | .............. | B60T 17/00 280/1 |
| 2012/0133201 A1 * | 5/2012 | Zeoli | ......................... | B60T 7/22 303/11 |
| 2015/0360658 A1 * | 12/2015 | Reiner | ...................... | B60T 8/42 303/113.1 |

FOREIGN PATENT DOCUMENTS

DE  102013225785 A1 *  6/2015  ............ B60T 8/4872
WO  2011/028376 A2     3/2011

* cited by examiner

Primary Examiner — Thomas J Williams
(74) Attorney, Agent, or Firm — Maginot, Moore & Beck LLP

(57) ABSTRACT

A pressure change damper for a pressure side of a hydraulic pump of a hydraulic vehicle brake system with brake force control includes a valve assembly. The valve assembly is fitted in the pressure change damper and has a tubular valve that defines a lip of a damper element between the valve assembly and a damper housing pressed into the valve housing. The valve housing and a tubular valve seat part are produced by forming.

5 Claims, 1 Drawing Sheet

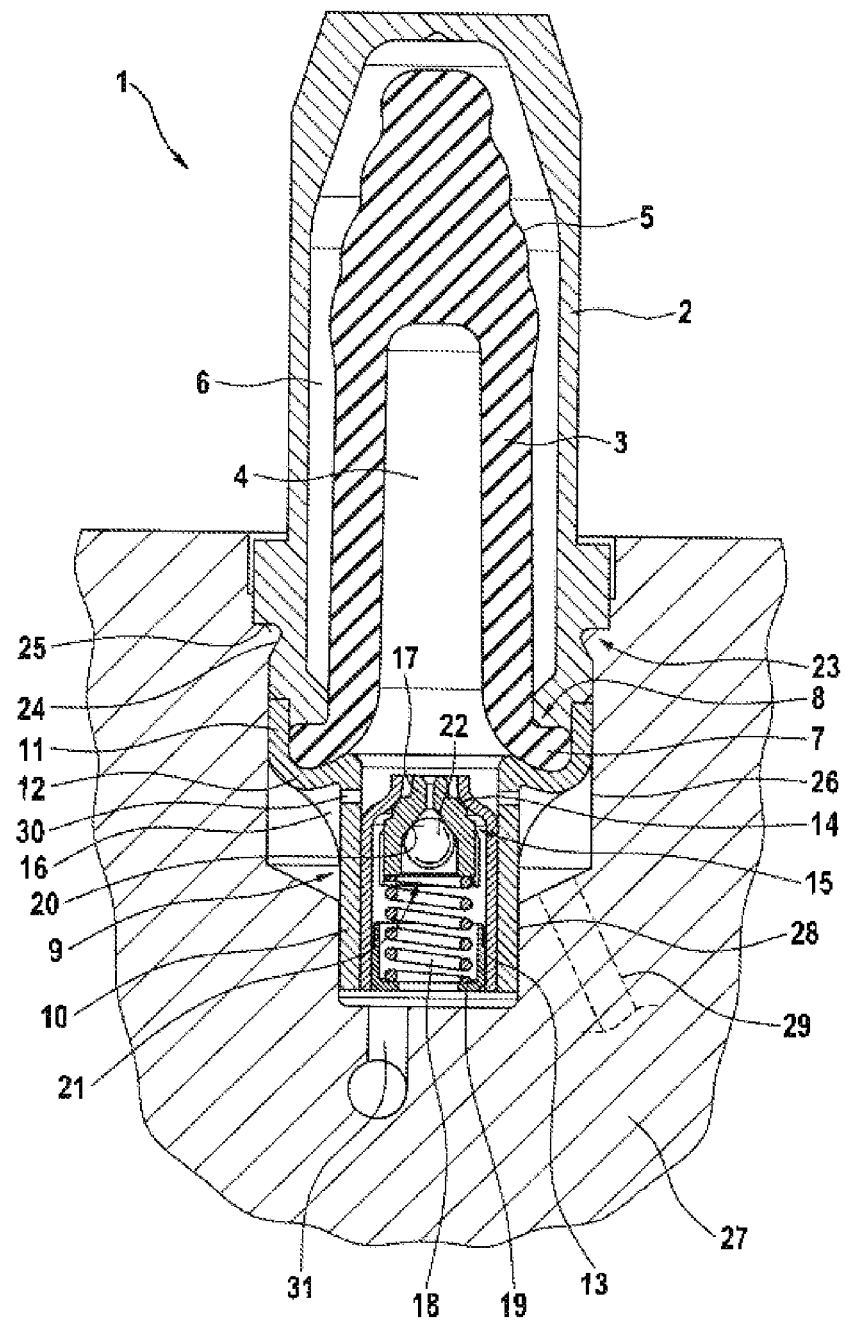

PRESSURE CHANGE DAMPER FOR A HYDRAULIC VEHICLE BRAKE SYSTEM WITH BRAKE FORCE CONTROL, AND HYDRAULIC VEHICLE BRAKE SYSTEM WITH BRAKE FORCE CONTROL WITH SUCH A PRESSURE CHANGE DAMPER

This application claims priority under 35 U.S.C. §119 to patent application no. DE 10 2014 226 005.1, filed on Dec. 16, 2014 in Germany, the disclosure of which is incorporated herein by reference in its entirety.

BACKGROUND

The disclosure concerns a pressure change damper for a hydraulic vehicle brake system with brake force control, and a hydraulic vehicle brake system with brake force control with such a pressure change damper.

Brake force control means that wheel brake pressures in the wheel brakes and hence the brake forces of the wheel brakes of a hydraulic vehicle brake system can be controlled preferably per individual wheel, for example for anti-lock braking, traction control, and/or electronic stability control which is generally also known as slide-slip control, or an automatic braking system or automatic cruise control, for which abbreviations such as ABS, ASR, FDR, ESP, ACC are commonly used. The list is exemplary and not conclusive. Such brake force controllers are known in principle and will not therefore be described in more detail.

Hydraulic vehicle brake systems with brake force control normally have a hydraulic pump, usually one hydraulic pump per brake circuit, also known as a return pump, which is often a piston pump. Because of their oscillating pumping manner, piston pumps cause pressure fluctuations in a brake fluid of a hydraulic vehicle brake system. Solenoid valves for wheel brake pressure regulation, when switching, cause pressure pulses in the brake fluid. To damp such pressure changes in the brake fluid of a hydraulic vehicle brake system, pressure change dampers are known which also reduce a noise generation and a repercussion on the brake master cylinder.

International patent application WO 2011/028 376 A2 discloses a hydraulic vehicle brake system with brake force control, with a tandem or dual circuit brake master cylinder to which two brake circuits are connected. To control the brake force, the known vehicle brake system has solenoid valves, check valves and in each brake circuit a high-pressure accumulator, a piston pump and a pressure change damper which is connected to a pump outlet of the piston pump, i.e. to a pressure side of the piston pump. In one embodiment, the known pressure change damper has a dome-like, rigid damper housing in which a hose-like damper element made of elastomer is arranged. Dome-like here means a tubular form closed at one end and open at the opposite end. The damper element also has a closed end which is arranged in the closed end of the damper housing. An open end of the damper element is arranged on or in the open end of the damper housing. The pressure change damper is arranged in a receiver bore in a hydraulic block of a brake force controller of a hydraulic vehicle brake system, wherein the closed ends of the damper housing and the damper element face a base of the receiver bore. A plug-like holder is pressed into an opening of the receiver bore in the hydraulic block, to seal the receiver bore in a pressure- and fluid-tight fashion, and establishes an outwardly protruding edge at the open end of the damper element between a flange at the open end of the damper housing and a ring step of the holder. The plug-like holder is fixed in the opening of the receiver bore in a so-called self-clinch fixing. Self-clinch means a circumferential caulking system in which, on pressing in the holder, the material of the hydraulic block deforms plastically into a circumferential groove of the holder, to form a pressure- and fluid-tight seal between the receiver bore and the holder. For deforming, the holder has a ring shoulder with a greater diameter than the rest of the holder which lies behind the circumferential groove in the pressing direction.

SUMMARY

The pressure change damper according to the disclosure is provided for a hydraulic vehicle brake system with brake force control. It has a tubular damper housing in which an elastically deformable, hose-like damper element is arranged. Tubular here does not necessarily mean cylindrical, but may for example also mean polygonal and/or tapering and/or widening. In particular, the damper housing is dome-like, which means a tubular form closed at one end, wherein a closed end may for example be flat or convex. The hose-like damper element is also preferably closed at one end and consists in particular of an elastomer such as EPDM.

According to the disclosure, the pressure change damper has a valve assembly with a tubular valve housing and an equally tubular valve seat part which has a valve seat and is pressed into the valve housing. The valve housing is arranged at an open end of the damper housing, for example the damper housing and the valve housing are push-fitted or pressed together. A valve is arranged in the valve housing, for example an inlet or outlet valve which controls the inflow to or outflow from the pressure change damper. The valve is for example a check valve or flow control valve.

The disclosure has the advantage that it is simple and economic to produce.

The subclaims concern advantageous embodiments and refinements of the disclosure.

Particularly preferably, the valve housing and/or the valve seat part are produced by forming, in particular deep drawing, because of the cheapness and speed of production compared with a cost-intensive production of a valve housing with a valve seat by material removal.

The disclosure furthermore concerns a hydraulic vehicle brake system with brake force control with a pressure change damper, wherein the pressure change damper is in particular connected to a pump outlet, i.e. a pressure side of a hydraulic pump of a brake force controller of the hydraulic vehicle brake system. Such hydraulic pumps are, as described above, often piston pumps which, because of their oscillating pumping manner, cause pressure fluctuations which are damped by the pressure change damper according to the disclosure.

BRIEF DESCRIPTION OF THE DRAWINGS

Further features of the disclosure arise from the description below of an embodiment of the disclosure in conjunction with the claims and the drawing. The individual features may be implemented alone or together in arbitrary combination as embodiments of the disclosure. The only FIGURE shows an axial section of a pressure change damper according to the disclosure.

DETAILED DESCRIPTION

The pressure change damper 1 according to the disclosure, shown in the drawing, has a tubular damper housing 2 with an open end and a closed end, which can also be described as dome-like. A hose-like damper element 3 is arranged in the damper housing 2 and also has an open end and a closed end. The damper element 3 consists of an elastic material, in this embodiment an elastomer, which is foamable. It is elastically deformable and may also be compressible, i.e. elastically changeable in volume or wall thickness. The damper element 3 has an almost cylindrical, slightly tapering cavity 4 which extends from the open end over around ⅔ of its length. In the longitudinal direction, approximately at level with one end of the cavity 4, the damper element 3 tapers outwardly at its closed end into a truncated cone with a circumferential undulation 5. An outer diameter of the damper element 3 is smaller than an inner diameter of the damper housing 2, so that the damper element 3 is surrounded by an intermediate space 6 in the damper housing 2. At the open end, the damper element 3 has a circumferential lip protruding obliquely towards the outside, with an approximately circular ring cross-section. A wall thickness of the damper element 3 is thinnest at a transition 8 from the lip 7 to a hose-like part at the open end of the damper element 3.

The damper element 1 has a valve assembly 9 which is arranged axially at the open end of the damper housing 2. The valve assembly 9 has a tubular valve housing 10 with a smaller diameter than the damper housing 2. At an end on the damper housing side, the valve housing 10 has a diameter widening as a receiver 11 for the open end of the damper housing 2. The receiver 11 has the form of a tubular collar in which the open end of the damper housing 2 can be pushed or pressed. A transition from the tubular collar 11 to a tubular part of the valve housing 10 with smaller diameter takes the form of a circumferential channel 12. The collar forming the receiver 11 for the open end of the damper housing 2, and the circumferential channel 12 of the otherwise tubular valve housing 9, are produced by forming, for example by deep drawing, wherein in this embodiment the valve housing 10 as a whole is produced by forming, in particular deep drawing. Together with the open end of the damper housing 2, the receiver 11 in the form of a tubular collar, and the circumferential channel 12 of the valve housing 10 adjacent thereto, form a circumferential groove in which the lip 7 lies at the open end of the damper element 3. The groove reduces in cross-section in the direction of an inwardly directed groove opening (at 8) which forms the narrowest point, so that the lip 7 is held in the circumferential groove between the open end of the damper housing 2 and the receiver 11 and the circumferential channel 12. The open end of the damper element 3 is thus held on or in the open end of the damper housing 2, and the intermediate space 6 which surrounds the damper element 3 in the damper housing 2 is closed and sealed.

A tubular valve seat part 13 is pressed into the valve housing 10 and, at its end facing the damper element 3, tapers in the manner of a hollow truncated cone finishing in a short tubular collar. An inside of the frustoconical constriction forms a valve seat 14 for a flow control valve 15 arranged in the tubular valve seat part 13. The constriction forming the valve seat 14 is produced by forming, for example by deep drawing, wherein in this embodiment, the valve seat 13 as a whole is produced by forming, in particular deep drawing. In comparison with a valve seat produced by material removal, the valve seat 14 produced by forming has a significantly higher quality and tightness at a fraction of the production cost.

On the outside, the valve housing 10 has beads 16 at the transition from the tubular part to the circumferential channel 12. The beads 16 bridge a peripheral chamfer at the transition from the groove 12 to the tubular part of the valve housing 10, and stiffen the valve housing 10 and the channel 12. The beads 16 are arranged in axial planes.

The flow control valve 15 has a hollow shut-off body 17 which is pressed with pretension against the valve seat 14 by a valve spring 18. In this embodiment, the valve spring 18 is a coil compression spring which rests on a tubular spring holder 19 which presses the valve seat 14 into the valve seat part 13. The shut-off body 17 of the flow control valve 15 has an axial through hole with a frustoconical constriction, which forms a valve seat 20 of a check valve 21. A ball is received in the through hole of the shut-off body 17 of the flow control valve 15 as the shut-off body 22 of the check valve 21. In the embodiment shown, the check valve 21 is unsprung, however a spring-loaded check valve is also possible (not shown).

Next to the open end, the damper housing 2 is formed as a caulking sleeve 23 for a self-clinch connection. For this, on the outside close to its open end, the damper housing 2 has a circumferential groove 24 with rounded groove cross-section, of which the rear groove flank 25 in the pressing direction is arranged in a radial plane of the damper housing 2 and protrudes to the outside. On pressing into a receiver 26 of a hydraulic block 27, the groove flank 25 deforms the material surrounding the receiver 27 of the hydraulic block 27 plastically into the groove 24 of the caulking sleeve 23, so the damper housing 22 is held mechanically stably in the hydraulic block 27 and is sealed pressure-tightly in the receiver 26.

The receiver 26 in the hydraulic block 27 is a blind hole of stepped diameter, wherein when the damper housing 2 is pressed in, the valve housing 10 arranged at its open end is pressed into a smaller diameter axial extension 28 of the receiver 26 and hence sealed on the periphery.

The hydraulic block 27, of which the drawing shows only a fraction surrounding the receiver 26 for the pressure change damper 1, is part of a brake force controller of a hydraulic vehicle brake system which is not otherwise shown. The hydraulic block 27 has further receivers for hydraulic elements of the brake force controller such as the hydraulic accumulator, solenoid valves and hydraulic pumps, and ports for brake lines to a brake master cylinder and to wheel brakes (not shown). The hydraulic elements and the ports for the brake lines are connected together hydraulically by the bores of the hydraulic block 27. Such hydraulic blocks of vehicle brake systems with brake force control are known to the person skilled in the art and not explained in more detail here. In manners known in themselves, the brake force controllers may be used for anti-lock braking, traction control, skid protection and electronic stability control, automatic braking and adaptive cruise control, for which the normal abbreviations are ABS, ASR, FDR, ESP, ACC. The list is exemplary and not conclusive.

A supply line 29 formed as an oblique bore in the hydraulic block 27 opens at a ring step between the smaller diameter extension 28 of the receiver 26 for the pressure change damper 1 and the receiver 26, and communicates through radial holes 30 in the valve housing 10 with the cavity 4 of the damper element 3. The holes 30 are arranged in the valve housing 10 distributed over a circumference between the valve seat 14 and the circumferential channel 12. The pressure change damper 1 communicates with a hydraulic pump (not shown), in particular a piston pump of the brake force controller, via the supply line 29. The pressure change damper 1 damps pressure pulsations in the brake fluid which are caused by a piston pump because of its oscillating pumping manner.

Via the check valve 19 and the flow control valve 15, the cavity 4 in the damper element 3 communicates with an outlet 31 configured as an axially parallel bore which opens eccentrically into a base of the extension 28 of the receiver 26 for the pressure change damper 1, and transforms into a transverse bore. In the embodiment of the disclosure shown, the check valve 19 and the flow control valve 15 are outlet valves of the pressure change damper 1.

What is claimed is:

1. A pressure change damper, comprising:
    a tubular damper housing open at one end;
    a tubular damper element open at one end, the damper element comprised of an elastic material and arranged in the damper housing, the open end of the damper element held sealing on or in the open end of the damper housing; and
    a valve assembly including (i) a tubular valve housing arranged at the open end of the damper housing and (ii) a valve arranged in the valve housing, the valve having a tubular valve seat part and a valve seat that is pressed into the valve housing, wherein the valve housing has a widening configured as a receiver for the open end of the damper housing, the widening configured by forming of the valve housing.

2. The pressure change damper according to claim 1, wherein the valve seat is configured as a constriction by forming of the valve seat part.

3. The pressure change damper according to claim 1, wherein the valve housing has beads in the axial plane, except in the region of the widening forming the receiver for the open end of the damper housing.

4. The pressure change damper according to claim 1, wherein both the valve housing and the valve seat part are configured by forming.

5. The pressure change damper according to claim 1, wherein:
    the receiver of the valve housing for the open end of the damper housing is a tubular collar which transforms into a circumferential channel with which the collar transforms into the tubular valve housing,
    the circumferential channel of the valve housing together with the open end of the damper housing forms a circumferential groove which tapers to a groove opening, and
    the tubular damper element has a circumferential lip on its open end which lies in the groove between the valve housing and the damper housing and which is thicker than the groove opening.

* * * * *